United States Patent [19]

Chihara

[11] Patent Number: 4,949,008

[45] Date of Patent: Aug. 14, 1990

[54] COLOR CATHODE RAY TUBE ASSEMBLY WITH MAGNETIC SHIELD

[75] Inventor: Kazuhiro Chihara, Nagaokakyo, Japan

[73] Assignee: Mitsubishi Denki Kabushiki Kaisha, Tokyo, Japan

[21] Appl. No.: 281,381

[22] Filed: Dec. 8, 1988

[30] Foreign Application Priority Data

Dec. 11, 1987 [JP] Japan ............................ 62-314440
Dec. 11, 1987 [JP] Japan ............................ 62-314438

[51] Int. Cl.[5] ........................ H01J 29/02; H04N 9/29
[52] U.S. Cl. .................................... 313/402; 313/479
[58] Field of Search ................................ 313/402, 479

[56] References Cited

FOREIGN PATENT DOCUMENTS 61-156166 9/1986 Japan .
61-264992 11/1986 Japan .
61-289787 12/1986 Japan .
62-64084 4/1987 Japan .
62-85592 4/1987 Japan .

OTHER PUBLICATIONS

RCA paper A51-161X "Color Picture Tube Assembly", issued Mar., 1976.

*Primary Examiner*—Kenneth Wieder

[57] ABSTRACT

A color cathode ray tube assembly includes an envelope including a funnel section, a neck section continued to one end of the funnel section, and a generally rectangular faceplate, which faceplate has a phosphor deposited screen and a rectangular side wall structure through which the faceplate is connected to the funnel section, a color selection mask disposed within the envelope in face-to-face relationship with the phosphor deposited screen; and a generally tubular outer magnetic shield made of a magnetizable material and mounted on the envelope so as to encircle the side wall structure of the faceplate and also the funnel section. The outer magnetic shield includes a generally tubular wall structure having a pair of opposite longer side walls extending generally parallel to the corresponding longer side walls of the faceplate, a pair of opposite shorter side walls extending generally parallel to the corresponding shorter side walls of the faceplate, and a corner wall positioned between respective ends of each longer side wall and the adjacent shorter side wall and confronting an associated corner between each longer side wall of the faceplate and the associated shorter side wall of the faceplate.

30 Claims, 9 Drawing Sheets

Direction of Terrestrial Magnetic Field Relative to Screen

COLOR CATHODE RAY TUBE ASSEMBLY WITH MAGNETIC SHIELD

BACKGROUND OF THE INVENTION

1. Field of the Invention

The present invention generally relates to a color cathode ray tube assembly and, more particularly, to the color cathode ray tube assembly including a color cathode ray tube provided with a magnetic shield for shielding the tube from an external magnetic field.

2. Description of the Prior Art

In general, it is not unusual that, during the operation of a color cathode ray tube used in, for example, a television receiver set, some of the electron beams travelling within the envelope of the cathode ray tube from an electron gun assembly towards a phosphor deposited screen are adversely affected by unwanted external magnetic fields other than the useful magnetic field developed by the deflection yoke. These unwanted external magnetic fields include those originating from the terrestrial magnetism and/or from various electronic circuit components used in the television receiver set. Once the electron beams are affected by the unwanted external magnetic fields, the electron beams travel having been deviated from their normal courses of travel and finally excite other phosphor dots on the screen than the phosphor dots which they were intended to excite. The erroneous deflection of the electron beams, or some of them, attributable to the unwanted external magnetic fields results in undesirable effects such as a reduction of the color purity.

In order to protect the color cathode ray tube from the unwanted external magnetic fields, various attempts have hitherto been proposed, which include the use of an outer magnetic shield made of an iron plate or a silicon-containing steel plate and surrounding exteriorly of a funnel section of the envelope, the use of an inner magnetic shield made of an iron plate or a silicon-containing steel plate and disposed within the funnel section for improving the magnetic shielding effect, or a combination of both to maximize the magnetic shielding effect. See the U.S. patent application Ser. No. 833,582 filed Feb. 26, 1986, by Kazuhiro Chihara et al., which application corresponds to the Japanese Laid-open Patent Publication No. 62-085592 published Apr. 20, 1987, and the Japanese Laid-open Utility Model Publications No. 62-064084 and No. 61-156166 published Apr. 21, 1987, and Sept. 27, 1986, respectively.

For the purpose of discussion of the prior art believed to be pertinent to the present invention, the color cathode ray tube employing both of the outer and inner magnetic shield will now be described in details with reference to FIGS. 1 and 2 of the accompanying drawings.

FIG. 1 illustrates a side view, with a portion cut away, of a prior art color cathode ray tube and FIG. 2 illustrates an exploded view of the color cathode ray tube shown in FIG. 1. As shown, the color cathode ray tube comprises a highly evacuated envelope 1 including a generally conical funnel section 1*b* having a large-sized end closed by a generally rectangular faceplate 1*a*, bonded thereto by the use of glass frit, and a small-sized end integrally continued to a generally cylindrical neck section 1*c*, and an electron gun assembly (not shown) housed within the neck section 1*c* at one end thereof opposite to the funnel section 1*b*. The faceplate 1*a* has a side flange and a screen plate, said screen plate having an inner surface deposited with a predetermined pattern of primary color elemental phosphor deposits, for example, triads of red, blue and green phosphor dots, thereby to form a phosphor deposited screen 9.

The cathode ray tube also comprises a color selection electrode or apertured shadow mask 2 which is a perforated thin metal foil having a predetermined pattern of apertures which are, in the illustrated example, slots 10. This apertured shadow mask 2 is supported under tension with its peripheral edge secured to a frame structure 3 made of a magnetizable metal of 1 to 2 millimeters in wall thickness. The frame structure 3 carrying the shadow mask 2 in the manner described above has a plurality of generally elongated elastic members 4 rigidly secured at one end to the frame structure 3 so as to extend generally radially outwardly therefrom and at the opposite end engaged to a respective anchor pin (not shown) embedded in the side flange of the faceplate 1*a*. With the elastic members so engaged to the anchor pins, the frame structure 3 having the apertured shadow mask 2 mounted thereon is supported in position within the envelope 1 with the apertured shadow mask 2 immovably spaced a predetermined distance from the luminescent phosphor deposited screen 9 having a space 20 therebetween.

The internal magnetic shield is generally identified by 5 and is of a shape generally similar to the funnel section 1*b* and is large enough to exteriorly encircle the electron beams 8 deflected and travailing towards the luminescent phosphor deposited screen 9. This internal magnetic shield 5 is made of a magnetizable metal plate of about 0.1 to about 0.2 millimeters in wall thickness and is retained at a front end by the frame structure 3 while extending from the frame structure 3 towards the boundary between the funnel section 1*b* and the neck section 1*c* and generally along the inner wall surface of the funnel section 1*b*.

The outer magnetic shield is generally identified by 7 and is made of a magnetizable metal plate and is so shaped and so structured as to exteriorly cover the funnel section 1*b* of the envelope 1. The outer magnetic shield 7 exteriorly covering the funnel section 1*b* has a generally tubular front extension 7*a* which exteriorly covers the faceplate 1*a* and, at the same time, protruding a certain distance frontwardly from the faceplate 1*a*.

When the color cathode ray tube of the above described construction is operated, the electron beams 8 emitted from the electron gun assembly within the neck section 1*c* travel through the slots 10 and subsequently impinge upon the phosphor deposited screen 9 to excite the luminescent phosphor dots deposited thereon. Hereinafter, with reference to FIG. 3, description will be made as to how the point of impingement of the electron beams 8 on the phosphor deposited screen 9 will be affected, that is, deflected, by the presence of the terrestrial magnetism when the color cathode ray tube is installed while oriented in a direction conforming to the east direction E, the west direction W, the south direction S and the north direction N.

Referring now to FIG. 3 illustrating the phosphor deposited screen 9 as viewed in a direction from the neck section 1*c* of the envelope 1, points a to i represent the respective exemplary landing points on the phosphor deposited screen 9 where the electron beams 8 ought to have impinged if they are not affected by the terrestrial magnetism. An arrow-headed vector line drawn from each landing point a to i and designated by one of E, W, S and N represents the direction in which the electron beams 8 intended to impinge upon such landing point a to i is deviated under the influence of the terrestrial magnetism, the length of which vector line represents the magnitude of such deviation. As is well known to those skilled in the art, on the earth there is the terrestrial magnetic field developing from the N-pole in the Antarctic to the S-pole in the Arctic.

Because of the presence of the terrestrial magnetism, as shown in FIG. 3, the direction of the terrestrial magnetic field relative to the phosphor deposited screen 9 extends in the arrow-headed direction E (towards a right-hand portion of the figure of FIG. 3) when the color cathode ray tube is oriented eastwards; in the arrow-headed direction W (towards a left-hand portion of the figure of FIG. 3) when the color cathode ray tube is oriented westwards; in the arrow-headed direction ⊗S (in one direction rearwardly of and perpendicular to the figure of FIG. 3) when the color cathode ray tube is oriented southwards; and in the direction ⊙N (in a direction forwardly of and perpendicular to the figure of FIG. 3) when the color cathode ray tube is oriented northwards. The electron beams 8 are generated from the electron gun assembly which is disposed inside the neck section 1*c* of the envelope 1 in alignment with the geometric center of the phosphor deposited screen 9 represented by the landing point e. The electron beams 8 so generated are, during their travel towards the phosphor deposited screen 9, deflected under the influence of the magnetic field developed by the deflection yoke so as to scan the phosphor deposited screen 9 horizontally and vertically from top to bottom of the phosphor deposited screen 9. Accordingly, as Fleming's left-hand rule makes it clear, the electron beams 8 ready to impinge upon the phosphor deposited screen 9 shift in such respective vector directions as shown in FIG. 3. In other words, where the color cathode ray tube are installed oriented eastwards or westwards, the electron beams 8 shift upwardly or downwardly of the phosphor deposited screen 9, but where the color cathode ray tube are installed oriented southwards or northwards, the electron beams 8 shift in a direction tangential to the circle depicted about the landing point e and in such respective direction as shown in FIG. 3.

FIG. 4 illustrates, on an enlarged scale, a portion of the phosphor deposited screen 9 on which triads of finely spaced and alternating stripes of primary color elemental phosphor deposits, for example, blue, red and green phosphor dots, designated by B, R and G, respectively. Each row of the slots 10 defined in the apertured shadow mask 2 corresponds in position to the respective triad of stripes B, R and G of primary color elemental phosphor deposits on the screen 9 and, therefore, the electron beams generated from the electron gun assembly when they impinge upon the corresponding phosphor stripes B, R or G after having passed through the slots 10 in the apertured shadow mask 2 excite such phosphor stripes permitting them to emit luminescent light.

In the case of the color cathode ray tube of the type wherein the luminescent phosphor deposits are formed in stripes such as shown in and described with reference to FIG. 4, the electron beam of a certain color necessarily impinges upon the phosphor stripe of the same color even though such electron beam is deviated upwardly or downwardly under the influence of the terrestrial magnetism, and, therefore, no reduction in color purity occurs substantially.

However, since the outer magnetic shield 7 used in the prior art color cathode ray tube and shown in FIG. 2 is of a generally rectangular shape, it has been found that, when the color cathode ray tube is installed oriented eastwards or westwards, magnetic fluxes tend to be disturbed at four corner areas of the outer magnetic shield 7. FIG. 5 illustrates the extent to which the magnetic flux is disturbed at one of the four corner areas of the outer magnetic shield 7 when the color cathode ray tube is oriented eastwards or westwards. As FIG. 5 makes it clear, where the color cathode ray tube is installed while oriented eastwards or westwards and is exposed to the magnetic field developed by the terrestrial magnetism, the magnetic fluxes develop in a direction leftwards and rightwards as viewed in FIG. 5. In such case, the magnetic fluxes 11 concentrated at a top or bottom portion of each shorter side wall 7*ab* of the shield extension 7*a* are discharged as magnetic leakage fluxes 12*a* towards a right-hand or left-hand portion of the adjacent longer side wall 7*aa* of the front extension 7*a* and then flow towards the associated longer side wall 7*aa* of the outer magnetic shield 7 where the magnetic resistance is low. However, since no shield is disposed within the space 20 delimited between the phosphor deposited screen 9 and the apertured shadow mask 2 as shown in FIG. 1, the magnetic leakage fluxes 12*a* so discharged affect the passage of the electron beams 8 then travelling in the vicinity of each corner area of the extension 7*a* of the outer magnetic shield 7 to such an extent as to result in the reduction in color purity.

Also, the outer magnetic shield 7 shown in FIG. 2 and used in the prior art color cathode ray tube has a plurality of, for example, two, cutouts 7*e* defined in each longer side wall 7*aa* of the shield extension 7*a* thereof for the passage therethrough of corresponding fixtures 30 that are used to secure the color cathode ray tube to a support structure fast or integral with the chassis in the television receiver set. Therefore, as shown in FIG. 5, different magnetic leakage fluxes 12*b* are produced at each cutout 7*e* in the longer side walls 7*aa* of the shield extension 7*a*, which fluxes 12*b* may also bring about adverse influence on the electron beams 8 travailing through the apertured shadow mask 2 towards the phosphor deposited screen 9 in a manner substantially similar to the magnetic leakage fluxes 12*a*, thereby to constitute an additional cause of the reduced color purity.

It is a recent trend that the color cathode ray tube are increasing in size. The larger the size of the color cathode ray tube, the larger the space 20 between the apertured shadow mask 2 and the phosphor deposited screen 9. For example, in the case of 37-inch, 110° deflection color cathode ray tube having the generally rectangular faceplate 9, the space 20 amounts to about 50 millimeters, and the amount of shift of the electron beams in the horizontal direction at the landing points a, c, g and i shown in FIG. 3 will be 148 micrometers when the magnetic field in the east-to-west direction is changed by 0.8 gausses.

Although the critical amount of shift of the electron beams varies depending on the type of the color cathode ray tube, the value of the critical shift amount (150 micrometers) is considered a standard value by which the color cathode ray tube can be determined practically acceptable in the case of 37-inch, 110° deflection color cathode ray tube.

As described above, the amount of shift of the electron beams in the prior art color cathode ray tube is of a value approximately equal to the critical shift amount of 150 micrometers and, in order to minimize the possible reduction in color purity due to the increased amount of shift of the electron beams resulting from variation in the space 20 during the manufacture of the color cathode ray tubes, the average value of the amounts of shift of the electron beams has to be minimized.

Also, in order to increase the effectiveness of counteracting, or canceling, the external magnetic field, an attempt has been as shown in FIG. 6 proposed wherein a N/S canceler coil 13 is disposed inside the front extension *7a* of the outer magnetic shield 7 so as to extend along the longer side walls *7aa* and the shorter side walls *7ab*, it being, however, to be noted that, in FIG. 6, Bv and E/W canceler coils are not illustrated for the purpose of simplicity. It is to be noted that Bv, N/S and E/W herein referred to represent vertical component, north-to-south component and east-to-west component of the external magnetic field, respectively. The outer magnetic shield 7 of the construction shown in FIG. 6 can be used in combination with the color cathode ray tube having the inner magnetic shield such as shown in FIG. 1 or with the color cathode ray tube having no inner magnetic shield. Since the canceler coil 13 is covered by the outer magnetic shield 7, the magnetic field developed by the flow of an electric current through the canceler coil 13 can effectively act on the color cathode ray tube with the outer magnetic shield 7 acting as a magnetic core, thereby increasing the canceler efficiency, that is, the efficiency of counteracting or canceling the external magnetic field.

However, according to the canceling system shown in and described with reference to FIG. 6, it has been found difficult to make a pattern of distribution of the magnetic field developed by the canceler coil 13 match with that of the external magnetic field such as the terrestrial magnetic field and, therefore, the occurrence of a shift of the electron beams cannot be eliminated at any point on the phosphor deposited screen. To describe in more detail, while the electron beams traveling towards the phosphor deposited screen through the apertured shadow mask tend to be deviated from their normal courses of travel under the influence of the external magnetic field, such as, for example, the terrestrial magnetic field, and finally impinge upon other phosphor dots on the screen than the phosphor dots which they were intended to impinge upon, it has been found difficult to effectively eliminate such deviation of the electron beams even when the electric current of an appropriate value is allowed to flow through the canceler coil 13.

In the known arrangement shown in FIG. 7, the canceler coil 13 is mounted exteriorly on the front extension *7a* of the outer magnetic shield 7 except for portions 13*a* and 13*b* thereof extending inwardly of the respective longer side walls *7aa*. More specifically, the canceler coil 13 shown in FIG. 7 have each portions 13*a* and 13*b* extending along an inner surface of a portion of the associated longer side wall *7aa* delimited between the cutouts *7e* while the remaining portion thereof extends exteriorly along the outer surfaces of the shorter side walls *7b*. The cutouts *7e* are provided for the passage of the fixtures 30 rigid with the cathode ray tube as is the case with those shown in FIG. 2. This is disclosed in, for example, the U.S. patent application Ser. No. 864,659 filed May 19, 1986, by Kazuhiro Chihara et al., which application corresponds to the Japanese Laid-open Patent Publications No. 61-264992 published Nov. 22, 1986, and No. 61-289787 published Dec. 19, 1986.

According to the system shown in FIG. 7, where the effect of canceling the external magnetic field is desired to be enhanced, the canceler coil 13 are allowed to extend inside the outer magnetic shield 7 and along the inner surfaces of the respective portions of the longer side walls *7aa* delimited between the cutouts *7e* as indicated by that portions 13*a* and 13*b* whereas, where the canceling effect is desired to be weakened, the canceler coil 13 is allowed to extend exteriorly of the outer magnetic shield 7 and along the outer surfaces of the respective shorter side walls *7ab* as indicated by portions 13*c* and 13*d*. By so doing, a desired pattern of distribution of the magnetic field counteracting or canceling the external magnetic field can be obtained.

As is the case with the system shown in and described with reference to FIG. 6, in FIG. 7 only the N/S canceler coil 13 for counteracting the external magnetic field acting in a direction generally parallel to the longitudinal axis of the color cathode ray tube is illustrated with the Bv and E/W canceler coils omitted. However, the Bv and E/W canceler coils are not always necessary if each of the side walls *7aa* and *7ab* has a length sufficient to overhang frontwardly of the faceplate *1a*.

As hereinabove discussed, in the system of FIG. 7, each of the cutouts *7e* defined in the longer side walls *7aa* of the outer magnetic shield 7 is cut from the front edge thereof inwardly towards a direction generally parallel to the longitudinal axis of the color cathode ray tube 1. The canceler coil 13 have each portions 13*a* and 13*b* extending along an inner surface of a portion of the associated longer side wall *7aa* delimited between the cutouts *7e* while the remaining portions 13*c* and 13*d* thereof extends exteriorly along the outer surfaces of the shorter side walls *7ab*.

As is well known to those skilled in the art, when the color cathode ray tube is installed while oriented northwards where the terrestrial magnetism exists, the electron beams impinging upon the phosphor deposited screen 9 undergoes a rotational shift as shown by the arrow-headed lines in FIG. 8, constituting a cause of color misconvergence and a raster rotation. Although the extent to which the electron beams shift varies depending on the angle of deflection of the color cathode ray tube 1, the size of the faceplate thereof, the specific structure of the electron gun assembly and other factors, the amount of shift varies from point to point on the phosphor deposited screen 9. By way of example, when the amount of deviation of the electron beams impinging upon the phosphor deposited screen 9, that is, the amount of misalignment of the electron beams, at each of locations shown by T, TTR, TR, TTR, and R in FIG. 8 are plotted on a graph corresponding to the top right-hand square area of the screen of the color cathode ray tube, such a curve shown by a in FIG. 9 can be obtained. The curve a shown in FIG. 9 has been obtained by plotting the amounts (expressed in terms of micrometer) of misalignment of the electron beams in a horizontal direction after having been demagnetized, which misalignment has occurred in the 37-inch, 110° deflection color cathode ray tube having the stripe-patterned phosphor deposited screen and also having the outer magnetic shield 7. During the test which has resulted in the curve a, a terrestrial magnetic force of about 0.3 gauss is applied to the color cathode ray tube in a direction generally parallel to the longitudinal axis of the color cathode ray tube and then the above mentioned demagnetization was carried out.

In the graph of FIG. 9, a curve b1, illustrates the amount of canceling compensation exhibited by the system of FIG. 6, and a curve b2 represents the amount of shortage of compensation. In other words, when the electric current sufficient to eliminate the misalignment of the electron beams at the point TR in one corner area of the phosphor deposited screen 9, that is, sufficient to render the amount of deviation of the electron beams aimed at the corner area TR to be zero, is supplied through the canceler coil 13 shown in FIG. 6, a sufficient compensation for the deviation of the electron beams cannot be achieved at the points T and TTR on the phosphor deposited screen 9 whereas the deviation of the electron beams at the point TRR is excessively compensated for. This is evidently shown by the curve b2 in the graph of FIG. 9. Note that the curve b1 is generally opposite in polarity to that exhibited by the curve a.

According to the system shown in and described with reference to FIG. 7, the amount of canceling compensation is exhibited by a curve c1 and the amount of shortage of compensation is exhibited by c2. Comparing the curve c2 exhibited by the system of FIG. 7 with the curve b2 exhibited by the system of FIG. 6 makes it clear that the amount of shortage of compensation in the system of FIG. 7 is considerably reduced. The reason for thin difference is discussed hereinafter.

Where the canceler coil 13 is positioned inside the outer magnetic shield 7 with the outer magnetic shield 7 serving as a magnetic core, that is, where the canceler coil 13 is positioned on one side of the outer magnetic shield 7 closer to the color cathode ray tube 1, a canceling magnetic field of relatively high density is developed inside the outer magnetic shield 7. On the other hand, where the canceler coil 13 is disposed outside the outer magnetic shield 7, such a canceling magnetic field of relatively high density is developed outside the outer magnetic shield 7. Hence, where the canceler coil 13 is disposed outside the outer magnetic shield 7, the resultant canceling magnetic field does not act on the color cathode ray tube so much as intended.

Even in the system of FIG. 7, when the canceler coil 13 is disposed in part inside the outer magnetic shield 7 and in part outside the outer magnetic shield 7, an unbalanced condition in which the misalignment of the electron beams at the point TTR is insufficiently compensated for and that at the points TR and TRR is excessively compensated for is still observable and, therefore, the system of FIG. 7 is far from the effective method of minimizing the misalignment of the electron beams at any point on the phosphor deposited screen. This appears attributable to the provision of the cutouts 7*e* at which the canceling effect tends to be reduced.

Unlike the use of the combination of the outer magnetic shield with the canceler coils shown in and described with reference to FIG. 7, RCA's A51-161X model color cathode ray tube now commercially available makes use of series-connected canceler (degaussing) coils mounted exteriorly on the funnel section of the envelope through a mounting strap so as to cover the external coating formed on the outer surface area of the funnel section. According to this model, the assembly of series-connected canceler coils does not extend over the circumference of the envelope, particularly the funnel section of the envelope, and, therefore, the misalignment of the electron beams can not be completely eliminated at any point on the phosphor deposited screen.

SUMMARY OF THE INVENTION

Accordingly, the present invention is aimed at substantially eliminating the above discussed problems inherent in the prior art color cathode ray tube assemblies and is intended to provide an improved color cathode ray tube assembly wherein the canceling effect relative to the external magnetic field is relatively high enough to substantially completely eliminate the misalignment of the electron means on the phosphor deposited screen.

According to a broad aspect of the present invention, there is provided a color cathode ray tube assembly which comprises a envelope including a funnel section, a neck section continued to one end of the funnel section, and a generally rectangular faceplate, which faceplate has a phosphor deposited screen and a rectangular side wall structure through which the faceplate is connected to the funnel section, a color selection mask disposed within the envelope in face-to-face relationship with the phosphor deposited screen; and a generally tubular outer magnetic shield made of a magnetizable material and mounted on the envelope so as to encircle the side wall structure of the faceplate and also the funnel section. The outer magnetic shield comprises a generally tubular wall structure having a pair of opposite longer side walls extending generally parallel to the corresponding longer side walls of the faceplate, a pair of opposite shorter side walls extending generally parallel to the corresponding shorter side walls of the faceplate, and a corner wall positioned between respective ends of each longer side wall and the adjacent shorter side wall and confronting an associated corner between each longer side wall of the faceplate and the associated shorter side wall of the faceplate.

Preferably, the outer magnetic shield comprises generally tubular rear and front wall structures each having a pair of opposite longer side walls, a pair of opposite shorter side walls, and a corner wall positioned between respective ends of each longer side wall and the adjacent shorter side wall, and a canceler coil having four consecutive portions, two of which extend along respective inner surfaces of the longer side walls of the front wall structure and the remaining two of which extend along respective outer surfaces of the shorter side walls of the front wall structure.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined solely by the appended claims. In the drawings, like reference numerals denote like parts in the several views, and:

FIG. 9 is a characteristic graph showing the amount of deviation or misalignment of the electron beams and the extent to which the deviation or misalignment of the electron beams are compensated for;

FIG. 11(*b*) is a partial front view of the outer magnetic shield of FIG. 10;

DETAILED DESCRIPTION OF THE EMBODIMENTS

Figure 1:
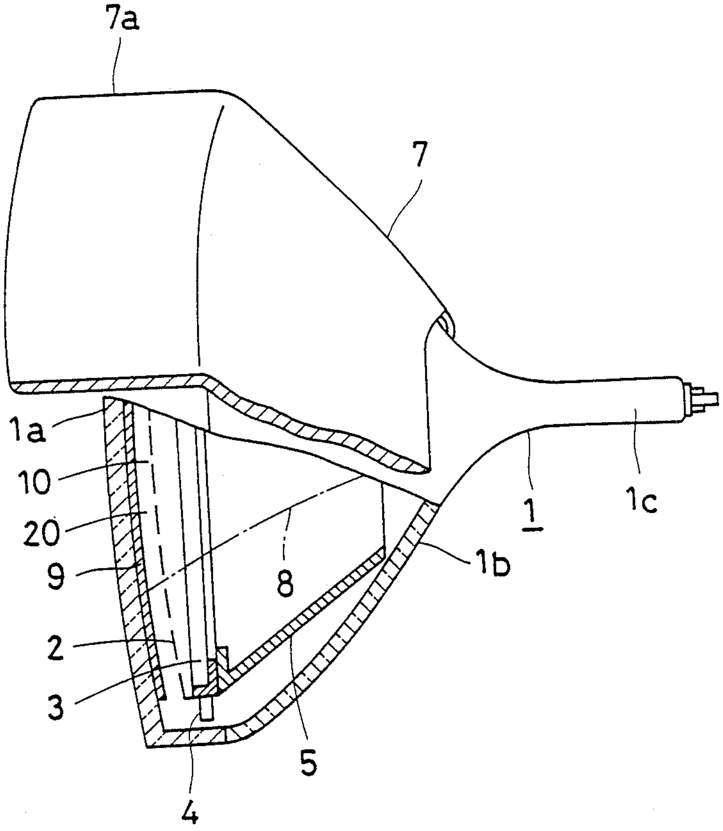
Fig. 1 Prior Art
FIG. 1 is a longitudinal side view, with a portion cut away, of the prior art color cathode ray tube assembly.
Figure 2:
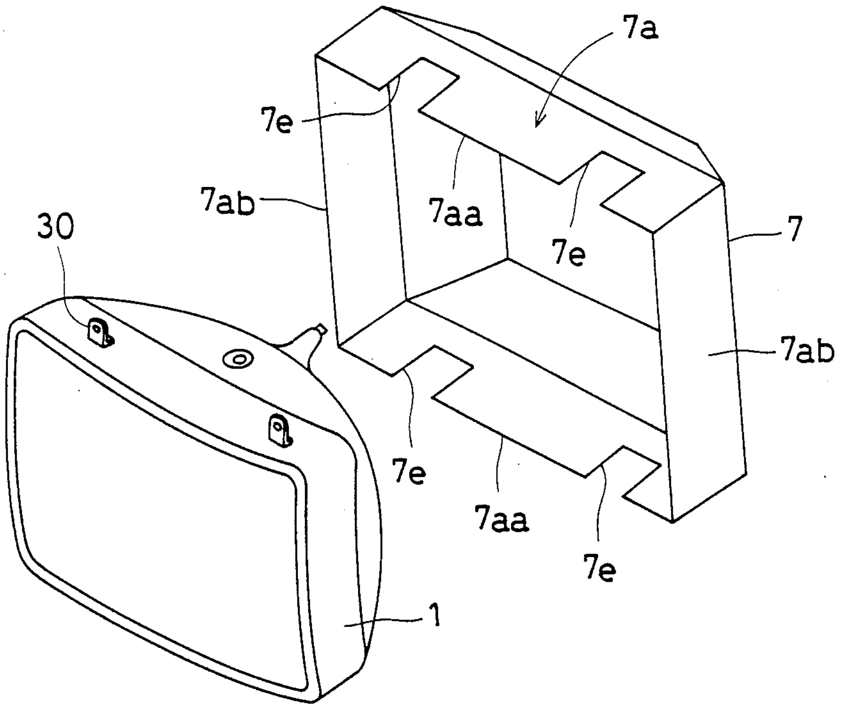
Fig. 2 Prior Art
FIG. 2 is an exploded view of the color cathode ray tube assembly of FIG. 1, showing the details of the outer magnetic shield.

A color cathode ray tube assembly according to a first preferred embodiment of the present invention is generally similar to the prior art color cathode ray tube assembly shown in and described with reference to FIG. 2, except for the difference found in the details of the outer magnetic shield as will now be described. It is to be noted that, although the color cathode ray tube itself is now shown in FIG. 10, the reference numerals used to designate component parts, such as the faceplate, funnel section and the neck section, of the color cathode ray tube in the following description appear in FIG. 1 or any other figures to which reference has been made in connection with the prior art.

As is well known to those skilled in the art, the generally rectangular faceplate 1*a* is in the form of a cup-shaped envelope cap including a screen plate, having an inner surface formed into the phosphor deposited screen 9, and a side wall structure extending from the peripheral edge of the screen plate in a direction generally perpendicular to the screen plate and also in a direction generally parallel to the longitudinal axis of the envelope 1. The side wall structure of the faceplate 1*a* includes a pair of opposite longer side walls and a pair of opposite shorter side walls.

Figure 10:
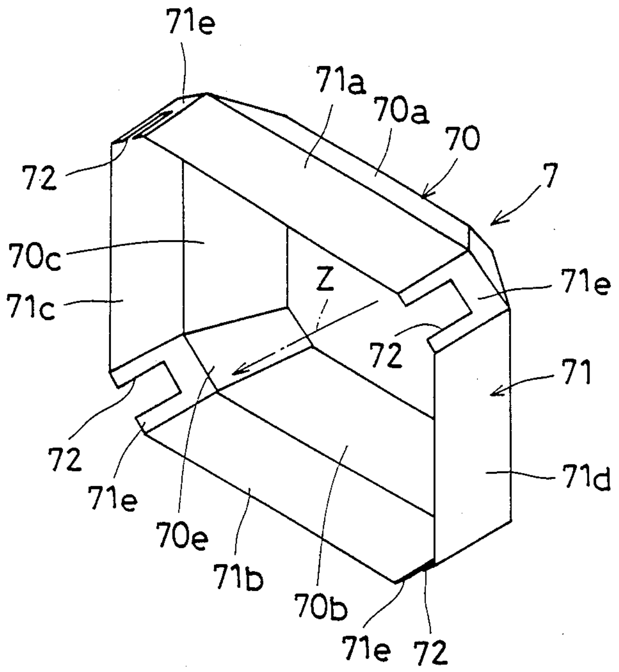
FIG. 10 is a perspective view of an outer magnetic shield used in a color cathode ray tube according to a first preferred embodiment of the present invention.

Referring to FIG. 10, the outer magnetic shield 7 used in the practice of the present invention is, so far illustrated, of one-piece construction comprising a rear wall structure, generally identified by 70 and adapted to substantially cover the funnel section 1*b* of the envelope 1, and a front wall structure generally identified by 71 and adapted to substantially cover the side wall structure of the faceplate 1*a*. The rear wall structure 70 extends rearwardly from the front wall structure 71 so as to converge towards the boundary between the funnel section 1*b* and the neck section 1*c* of the envelope 1 as the funnel section 1*b* is so shaped as to converge in a direction from the faceplate 1*a* towards the neck section 1*c*.

The rear wall structure 70 includes a pair of opposite, substantially trapezoidal longer side walls 70*a* and 70*b*, a pair of opposite, substantially trapezoidal shorter side walls 70*c* and 70*d* and two pairs of diagonally opposed, substantially trapezoidal corner walls generally identified by 70*e*, it being to be noted that, of the two pair of the diagonally opposed corner walls 70*e*, only one pair of the corner walls, one located between the longer side wall 70*a* and the shorter side wall 70*d* and the other between the longer side wall 70*b* and the shorter side wall 70*c*, are illustrated in FIG. 10.

Similarly, the front wall structure 71 includes a pair of opposite, substantially rectangular longer side walls 71*a* and 71*b*, a pair of opposite, substantially rectangular shorter side walls 71*c* and 71*d* and two pairs of diagonally opposed, generally square corner walls generally identified by 71*e*.

More specifically, the rear wall structure 70 is of a construction wherein the longer side walls 70*a* and 70*b* are connected together by means of the shorter side walls 70*c* and 70*d* through the adjacent corner walls 70*e*. Each of the longer side walls 70*a* and 70*b* is connected at opposite ends with the respective corner walls 70*e* so as to form an obtuse angle between the longer side wall 70*a* or 70*b* and the adjacent corner wall 70*e*. Similarly, the front wall structure 71 is of a construction wherein the longer side walls 71*a* and 71*b* are connected together by means of the shorter side walls 71*c* and 71*d* through the adjacent corner walls 71*e*. Each of the longer side walls 71*a* and 71*b* is connected at opposite ends with the respective corner walls 71*e* so as to form obtuse angel between the longer side wall 71*a* or 71*b* and the adjacent corner wall 71*e*. The walls 71*a*, 71*b*, 71*c*, 71*d* and 71*e* forming the front wall structure 71 has one side from which the walls 70*a*, 70*b*, 70*c*, 70*d* and 70*e* forming the rear wall structure 70 extend, respectively, in a direction towards the neck section 1*c* of the envelope 1 while forming an obtuse angle therebetween.

Each of the corner walls 71*e* of the front wall structure 71 is formed with a generally u-shaped cutout 72 cut inwardly from a free side edge thereof so as to extend in a direction generally parallel to the longitudinal axis of the envelope 1 for the passage therethrough of the corresponding fixture 30 that is mounted on the faceplate 1*a* and is used to secure the color cathode ray tube to a support structure fast or integral with the chassis in the television receiver set. Preferably, each of the walls 71*a* to 71*e* forming the front wall structure 71 has a width enough to permit it to protrude a predetermined distance frontwardly from an outer surface of the screen plate of the faceplate 1*a*.

Also, the outer magnetic shield 7 of the above described construction according to the present invention is made of a magnetizable material such as, for example, iron plate or silicon-containing steel plate. The outer magnetic shield 7 of one-piece construction as herinabove described can be manufactured by the use of any known press work. However, the present invention is not intended to exclude the outer magnetic shield of plural component design, for example, wherein the front and rear wall structures are welded together or wherein the walls forming one of the rear and front wall structures are welded together to provide the rear or front wall structure which is subsequently welded to the other of the rear and front wall structure.

The outer magnetic shield of the construction according to the first preferred embodiment of the present invention, when mounted on the color cathode ray tube, operates in the following manner.

Figure 11:
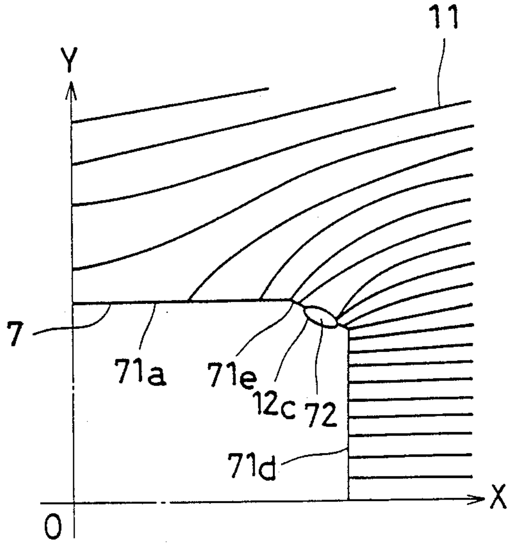
FIG. 11(*a*) is a diagram similar to FIG. 5, showing the pattern of distribution of the magnetic field exhibited by the use of the outer magnetic shield of FIG. 10.
Figure 11B:
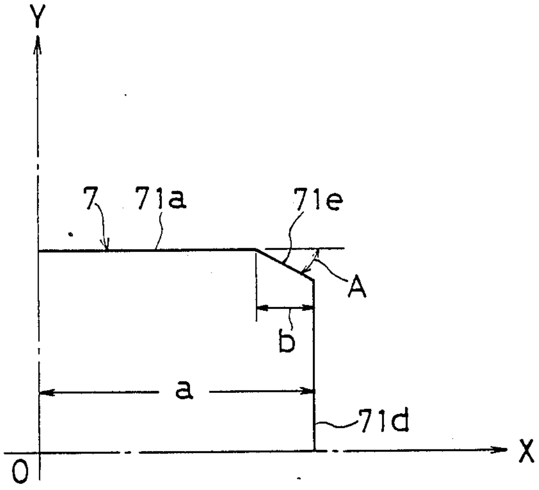

FIG. 11(*a*) illustrates a pattern of distribution of magnetic fluxes in the vicinity of a top right-hand area of the phosphor desposited screen when the color cathode ray tube assembly, including the color cathode ray tube with the outer magnetic shield mounted thereon, is installed while oriented eastwards or westwards. As shown in FIG. 11, when the magnetic field acting in the east-to-west direction is applied, it has been observed that, although the magnetic fluxes 11 concentrates on the corner portion between the longer side wall 71*a* and the shorter side wall 71*d* as is the case with the prior art system shown in FIG. 5, the provision of the corner wall 71*e* in the outer magnetic shield 7 according to the present invention between the longer side wall 71*a* and the shorter side wall 71*d* provides a path for the passage of the lines of magnetic force thereby permitting them to extend towards the longer side wall 71*a*.

Figure 5:
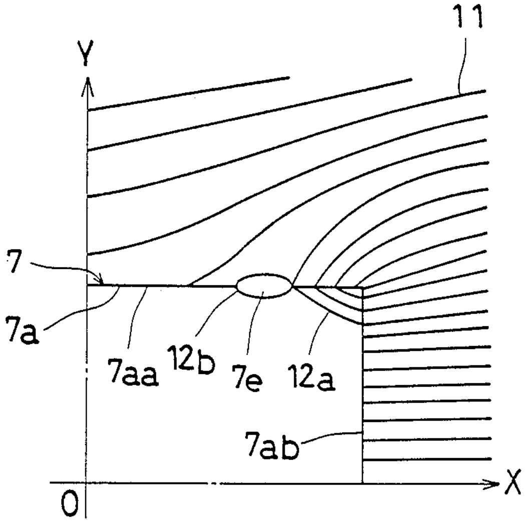
Fig. 5 Prior Art
FIG. 5 is a diagram showing the pattern of distribution of magnetic fluxes in a portion of the phosphor deposited screen used in the prior art color cathode ray tube assembly.
Figure 6:
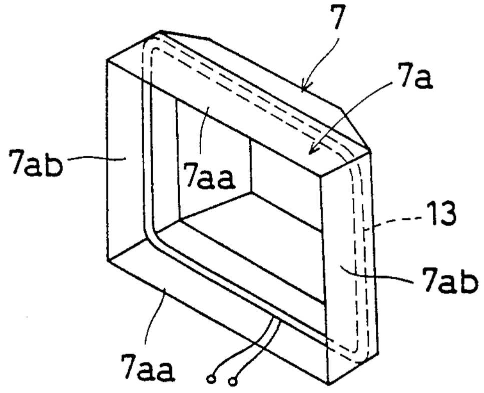
Fig. 6 Prior Art
FIG. 6 is a schematic perspective view of the outer magnetic shield of the prior art.

Although the formation of the cutout 72 in the respective corner wall 71*e* for the passage therethrough of the corresponding fixture 30 may constitute a cause of the leakage of some of the magnetic fluxes as indicated by 12*c*, the amount of the magnetic fluxes 12*c* so leaking through the cutout 72 can be advantageously reduced considerably as compared with the among of the magnetic fluxes 12*a* in the prior art system of FIG. 5 because the respective corner wall 71*e* is so arranged and so shaped as to conform to the path of the magnetic fluxes.

Also, according to the present invention, since no cutout is formed in any one of the longer side walls 71*a* and 71*b* and, therefore, an effective path for the passage of the lines of magnetic force is formed extending from one corner area of the outer magnetic shield 7 and along the longer side wall, the magnetic fluxes which will be discharged into the space 20 between the phosphor deposited screen 9 and the apertured shadow mask 2 can be substantially eliminated, thereby minimizing the reduction in color purity.

Since the magnetic fluxes 11 referred to above extend generally parallel to each other, the leaking magnetic fluxes 12*a* shown in FIG. 5 generally extend generally at an angle of 45° or smaller relative to the horizontal line. Accordingly, as shown in FIG. 11(*b*), the angle A of downward inclination of the corner wall 71*e* relative to the adjacent longer side wall 71*a* or 71*b* which lies in a horizontal plane is preferably chosen to be 45° or smaller so that the corner wall 71*e* can extend parallel to the direction of the passage of the leaking magnetic fluxes 12*a*. Experiences have shown that the ratio b/a of the length b of the corner wall 71*e* as measured in a direction parallel to the adjacent longer side wall 71*a* or 71*b* relative to the half length a of the adjacent longer side wall 71*a* or 71*b* (i.e., half the width of the adjacent longer side wall 71*a* or 71*b*) is preferred within the range of greater than 0.1 to 0.2, because if the ratio b/a is not greater than the lower limit of 0.1, the outer magnetic shield would represent a shape similar to that of the prior art outer magnetic shield 7 shown in FIG. 2 and, therefore, the leaking magnetic fluxes 12*a* may therefore not be absorbed sufficiently. On the other hand, while it is a general practice in the art to provide a space between the outer magnetic shield 7, made of metal, and the envelope 1, made of glass, to avoid any possible damage to the glass envelope 1 which would occur when the metallic outer magnetic shield 7 contacts the glass envelope 1, it would become difficultt to avoid the contact between the corner wall 71*e* and a corresponding corner portion of the envelope 1 while a space is maintained therebetween if the ratio b/a is not smaller than the upper limit of 2.0. It is to be noted that, in most cathode ray tube assemblies currently available in the commercial market, each corner portion of the envelope is generally rounded and, in the case of the 14-inch cathode ray tube, the radius of curvature of each corner portion thereof is generally 27 mm. Even in the other cathode ray tube assemblies, the radius of curvature of each corner portion of the envelope used therein varies in proportion to the size of the faceplate 1*a*, and therefore, the upper limit of the above discussed ration b/a is preferred to be 0.2 regardless of the size of the cathode ray tube assembly.

With the use of 37-inch, 110° deflection color cathode ray tube assembly provided with the outer magnetic shield 7 of the construction shown in and described with reference of FIG. 10, a series of experiments have been conducted to determine the amount of deviation (misalignment) of the electron beams when the magnetic field acting in the east-to-west direction is changed by 0.8 gausses, the results of which are tabulated in the following table. It is to be noted that, in the particular cathode ray tube assembly used in the experiments, the Angle A and the ratio b/a, both referred to above, were 45° and 0.16.

Figure 4:
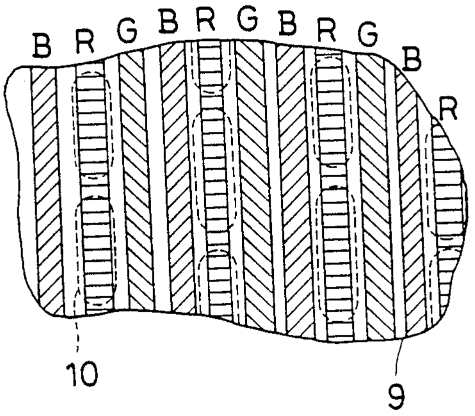
FIG. 4 is a digram, on an enlarged scale, showing a portion of the phosphor deposited screen in the color cathode ray tube assembly.

For the purpose of comparison, the amount of deviation of the electron beams occurring under the same condition, but exhibited by the color cathode ray tube assembly shown in FIG. 4 is also shown in the following table.

TABLE

| | Points of Measurement (Unit: micrometer) | | | | | | | | | | |
|---|---|---|---|---|---|---|---|---|---|---|---|
| | b | b1 | c | c1 | e | f | f1 | j | j1 | k | k1 |
| Prior Art | 10 | 0 | 148 | 35 | 0 | 20 | 0 | 140 | 30 | 76 | 20 |
| Invention | 0 | 0 | 108 | 15 | 0 | 0 | 0 | 40 | 0 | 45 | 0 |

Figure 3:
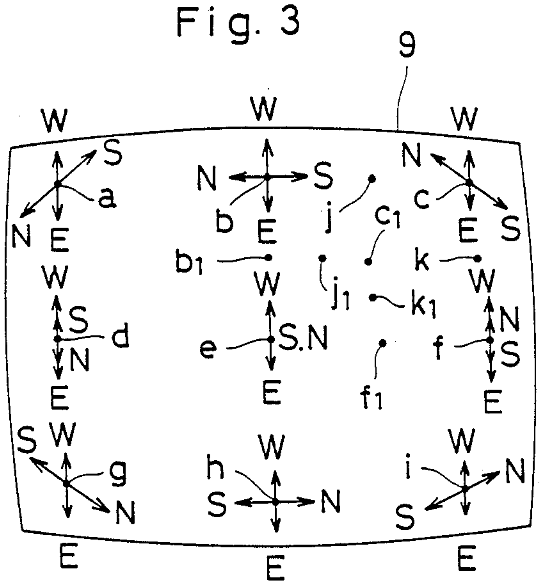
FIG. 3 is a view showing the phosphor deposited screen used to explain how the electron beams traveling from the electron gun assembly towards the phosphor deposited screen are affected by the terrestrial magnetism.
Figure 3:
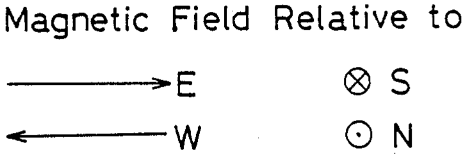

The points b, b1, c, c1, e, f, f1, i, i1, k and k1 means were measured are depicted in FIG. 3. Specifically, as shown in FIG. 3, the measuring point j lies intermediate between the points b and c; the measuring point k lies intermediate between the points c and f; and the measuring points b1, c1, f1, j1 and k1 lie intermediate between the point e (the center of the phosphor deposited screen 9) and the points b, c, f, j and k, respectively.

As can be understood from the above table, according to the present invention, the amount of deviation of the electron beams at the point c and that at point j are reduced about 73% and about 29% respectively, as compared with those exhibited by the prior art color cathode ray tube assembly. Therefore, the outer magnetic shield 7 according to the embodiment shown in and described with reference to FIG. 10 is effective to exhibit a relatively large shielding effect.

Thus, it has now become clear that, since according to the embodiment of FIG. 10 the corner wall is provided at each corner area of the generally rectangular front wall structure 71 of the outer magnetic shield 7 while the front wall structure 71 is so sized and so shaped as to extend the predetermined distance frontwardly from the surface of the screen plate of the faceplate 1*a* in a direction opposite to the funnel section 1*b*, any possible reduction of the color purity attributable to the external magnetic field can be advantageously minimized.

Figure 12:
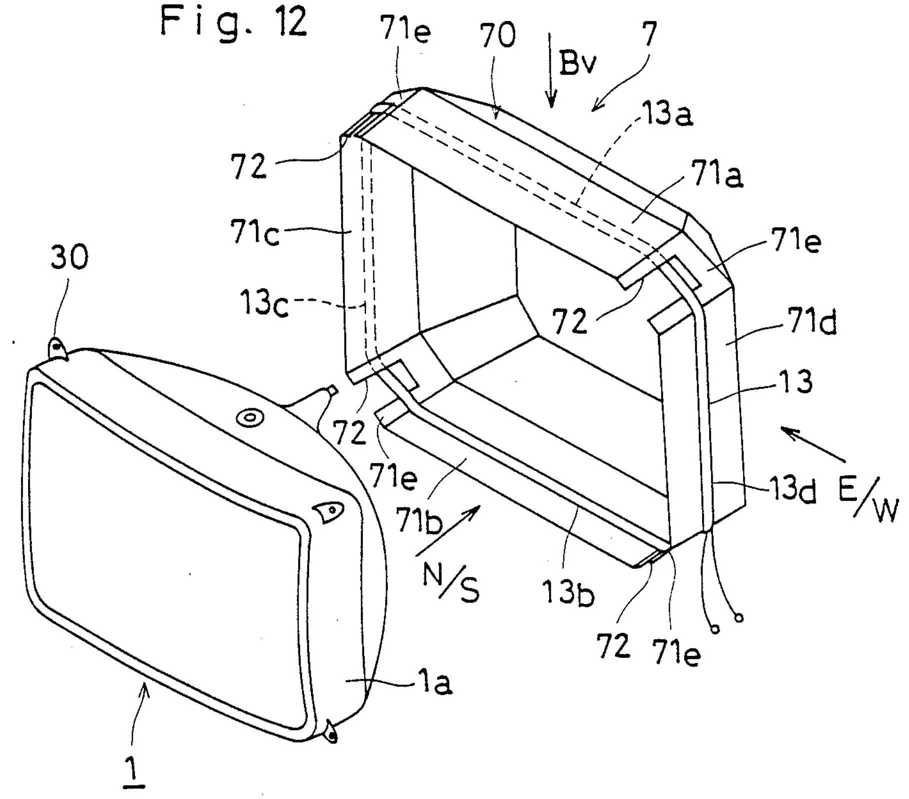
FIG. 12 is an exploded view of a color cathode ray tube assembly according to another preferred embodiment of the present invention, showing the details of the outer magnetic shield.

The following embodiment shown in FIG. 12 differs from the foregoing embodiment in that, while no canceler coil is employed in the outer magnetic shield 7 of the foregoing embodiment, a N/S canceler coil 13 is employed in the embodiment of FIG. 12 for increasing the canceling effect.

More specifically, as shown in FIG. 12, the canceler coil 13 has four consecutive portions 13*a*, 13*d*, 13*b* and 13*c* over the length therof and is mounted on the front wall structure 71 of the outer magnetic shield 7 with the portions 13*a* and 13*b* thereof positioned inside the outer magnetic shield 7 and with the portions 13*c* and 13*d* positioned outside the outer magnetic shield 7. In other words, from one end to the opposite end of the canceler coil 13, the canceler coil 13 extends along an outer surface of the shorter side wall 71*d*as indicated by 13*d*; then along an outer surface of the longer side wall 71*a*, as indicated by 13*a*, after having passed through the cutoff 72 between the longer side wall 71*a* and the shorter side wall 71*d*; along an outer surface of the shorter side wall 71*c*, as indicated by 13*c*, after having passed through the cutout 71*e* between the longer side wall 71*a* and the shorter side wall 71*c*; and finally along an inner surface of the longer side wall 71*b*, as indicated by 13*b*, after having passed through the cutout 72 between the shorter side wall 71*c* and the longer side wall 71*b*.

The outer magnetic shield of the construction according to the second preferred embodiment of the present invention, when mounted on the color cathode ray tube, operates in the following manner.

When the color cathode ray tube mounted with the outer magnetic shield 7 of the construction shown in and described with reference to FIG. 12 is installed while oriented northwards or southwards and when the external magnetic field acting in the south-to-north direction is applied thereto in a direction generally parallel to the longitudinal axis of the envelope 1, the magnetic fluxes pass through the outer magnetic shield 7. Accordingly, the amount of deviation of the electron beams at each of the points T and TTR in the vicinity of the longer side wall as shown in FIG. 8 is, as shown by the curve b in the graph of FIG. 9, smaller than the amount of deviation of the electron beams exhibited by the prior art outer magnetic shield of FIG. 1 which is exhibited by the curve a in the graph of FIG. 9.

Figure 8:
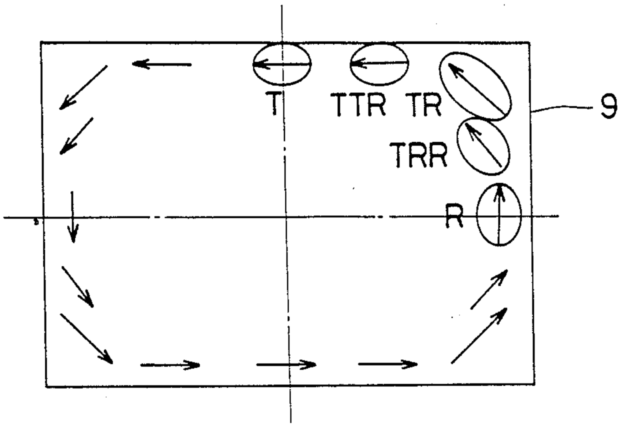
FIG. 8 is a diagram showing the direction in which the electron beams as viewed on the phosphor deposited screen are deviated under the influence of an external magnetic field acting in a direction generally parallel to the longitudinal axis of the envelope of the color cathode ray tube.
Figure 13:
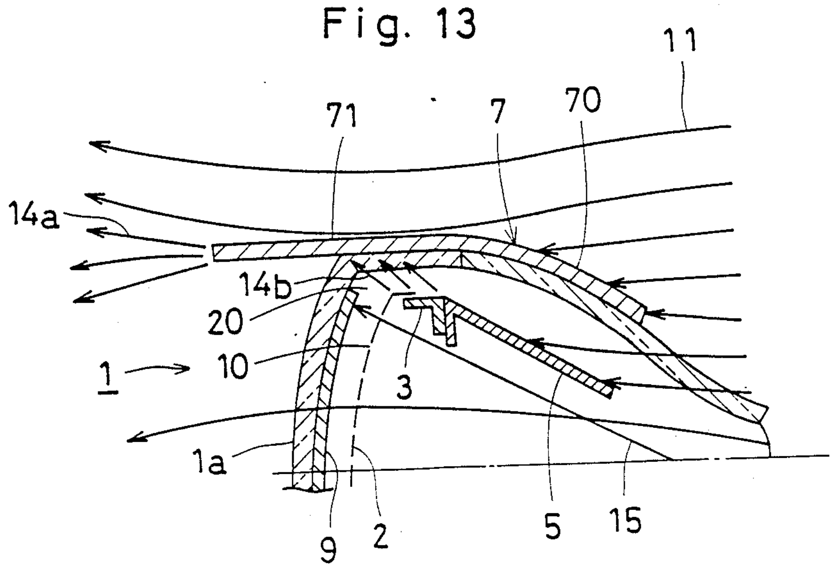
FIG. 13 is a longitudinal sectional view of a portion of the color cathode ray tube assembly, showing the patter of distribution of the magnetic fluxes resulting from the external magnetic field.

Although the amount of deviation of the electron beams at the point TR in the vicinity of the corner area as shown in FIG. 8 tends to increase because of the increased magnetic resistance provided for by the presence of the cutouts 72, the provision of the corner walls 71*e* is effective to minimize the increase of the amount of deviation of the electron beams at the point TR. In other words, as shown in FIG. 13, when the external magnetic field is applied in the direction generally parallel to the longitudinal axis of the envelope 1, the magnetic fluxes 11 thereof flow through a parallel magnetic circuit extending through the frame structure 3 for the support of both of the apertured shadow mask 2 and the inner magnetic shield 5. Lines 14*a* of magnetic force extending through the outer magnetic shield 7 are discharged outwardly from the free side edge of the front wall structure 71 opposite to the rear wall structure 70.

On the other hand, lines 14*b* of magnetic force extending through the inner magnetic shield 5 are discharged from a front edge of the frame structure 7 adjacent the phosphor desposited screen 9. However, since the magnetic resistance in the space 20 between the apertured shadow mask 2 and the phosphor deposited screen 9 in the faceplate 1*a* is very high, a majority of the lines 14*b* of magnetic force discharged from the front edge of the frame structure 3 enters the outer magnetic shield 7 whose magnetic resistance is low, and are then discharged outwardly from the free side edge of the front wall structure 71. Accordingly, of the lines 14*b* of magnetic forces discharged from the front edge of the frame structure 3, the amount of the lines of magnetic force entering the periphery of the apertured shadow mask 2 can be minimized considerably and, therefore, any possible influence they may bring about on the electron beams 15 then passing through the slots 10 in the apertured shadow mask 2 can be advantageously minimized.

Figure 7:
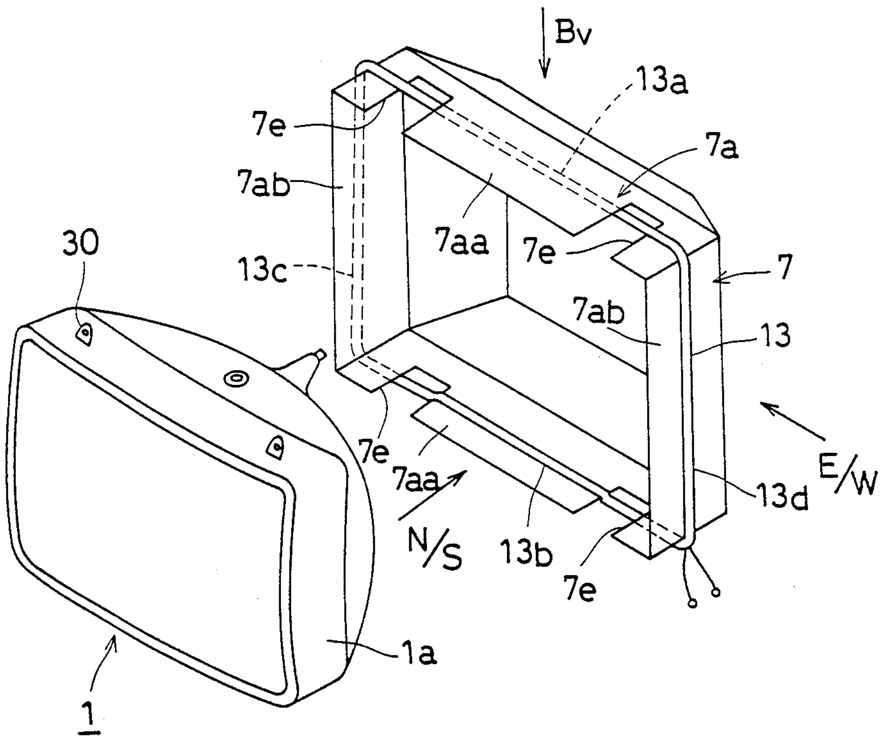
Fig. 7 Prior Art
FIG. 7 is a view similar FIG. 2, showing another outer magnetic shield of the prior art.

In the outer magnetic shield 7 of the prior art construction shown in described with reference to FIG. 7, the longer side walls 7*aa* and the shorter side walls 7*ab* are connected orthogonal to each other and, therefore, when it is mounted around the evacuated envelope 1 of the color cathode ray tube, a relatively great gap is formed between each corner of the faceplate 1*a* and the associated joint between the longer side wall 7*aa* and the shorter side wall 7*ab*, the space represented by such gap posing a relatively high magnetic resistance. In contrast thereto, according to the second preferred embodiment of the present invention shown in FIGS. 12 and 13, because of the provision of the corner walls 71*e*, the front wall structure 71 of the outer magnetic shield 7 could be so configured to extend along the circumference of the faceplate 1*a* while spaced a generally uniform and reduced distance from the side walls of the faceplate 1*a*, the magnetic resistance created by the presence of a gap between each corner of the faceplate 1*a* and the associated corner wall 71*e* could be considerably lower than that in the prior art construction of FIG. 7, the consequence of which is that a relatively large amount of deviation of the electron beams which is comparable to the value at the point TR in the curve a shown in the graph of FIG. 9 can be attained.

Figure 9:
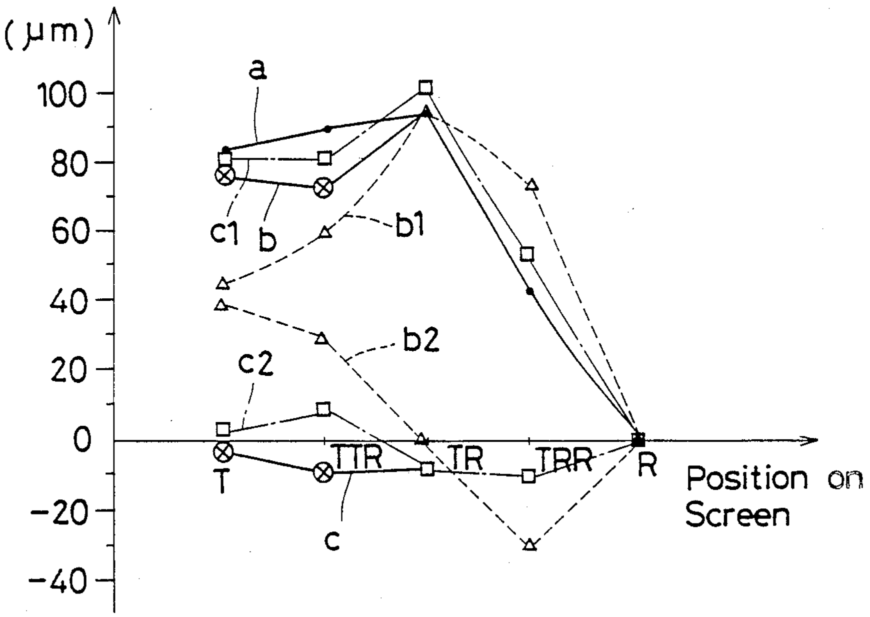

When this relatively large amount of deviation of the electron beams comparable to the value at the point TR in the curve a is counteracted or degaussued, the amount of the deviation compensated for is represented by the curve c1 in the graph of FIG. 9 and, therefore, the amount of shortage of compensation is such as shown by the curve c3 in the same graph of FIG. 9. In other words, the amount of deviation of the electron beams at the points TR and TTR shown in FIG. 8 can be excessively compensated for. Accordingly, since a somewhat excessively compensated condition can be obtained at any point on the phosphor deposited screen, the deviation of the electron beams can be substantially completely suppressed by slight adjustment of the electric current which flows through the canceler coil 13.

Thus, according to the second preferred embodiment of the present invention, the outer magnetic shield comprises generally tubular rear and front wall structures each having a pair of opposite longer side walls, a pair of opposite shorter side walls, and a corner wall positioned between respective ends of each longer side wall and the adjacent shorter side wall, and a cancelor coil having four consecutive portions, two of which extend along respective inner surfaces of the longer side walls of the front wall structure and the remaining two of which extend along respective outer surfaces of the shorter side walls of the front wall structure. Accordingly, by adjusting the electric current to be supplied through the canceler coil, a uniformly balanced patter of distribution of magnetic field necessary to counteract the unwanted external magnetic field can be obtained over the circumference of the envelope.

Although the present invention has fully been described in connection with the preferred embodiments thereof with reference to the accompanying drawings used only for the purpose of illustration, those skilled in the art will readily conceive numerous changes and modifications within the framework of obviousness upon the reading of the specification herein presented of the present invention. By way of example, although in describing the first and second preferred embodiments of the present invention the color cathode ray tube has been shown and desribed as having the stripe-patterned phosphor deposited screen as shown in FIG. 4, the present invention can be equally applicable to any other color cathode ray tube having a luminescent phosphor screen formed of a predetermined pattern of primary color elemental phosphor dots, for example, triads of red, blue and green phosphor dots.

Also, in the second preferred embodiment of the present invention, where the unwanted external magnetic field is an alternating magnetic field created by an alternating current, the degaussing can be accomplished by supplying an alternating current through the canceler coil 13.

The color cathode ray tube referred to in the foregoing description in connection with the first and second preferred embodiment of the present invention is of a large size. Where the present invention is applied to a small-size color cathode ray tube, the outer magnetic shield 7 may be rigidly mounted and retained in position on the envelope so as to enclose the faceplate and the funnel section by the use of a bonding agent filled into and cured in a gap between the outer magnetic shield and the envelope and the assembly of the color cathode ray tube and the outer magnetic shield may then be supported in position within the television receiver cabinet through fixtures secured to the outer magnetic shield. In such case, as far as the first preferred embodiment of the present invention shown in and described with reference to FIG. 10 is concerned, the circuit 72 may not be always necessary and may be dispensed with. Even without the cutouts 72 in the outer magnetic shield 7 shown in FIG. 10, no appreciable reduction in canceling effect occur.

Accordingly, such changes and modifications are, unless they depart from the spirit and scope of the present invention as delivered from the claims annexed hereto, to be construed as included therein.

What is claimed is:

1. A color cathode ray tube assembly which comprises:

a highly evacuated envelope including a funnel section, a neck section continued to one end of the funnel section, a generally rectangular faceplate, said faceplate comprising a rectangular screen plate having an inner surface formed with a predetermined pattern of primary color elemental phosphor deposits to complete a phosphor deposited screen and a rectangular side wall structure, said side wall structure of the faceplate protruding from a peripheral edge of the screen plate in a direction towards the funnel section and including a pair of opposite longer side walls and a pair of shorter side walls, said faceplate being connected to the funnel section with said longer and shorter side walls integrated with the other end of the funnel section;

a color selection mask disposed within the evacuated envelope in face-to-face relationship with the phosphor deposited screen; and a generally tubular outer magnetic shield made of a magnetizable material and mounted on the evacuated envelope so as to encircle the side wall structure of the faceplate and also the funnel section, said outer magnetic shield comprising:

a generally tubular wall structure having a pair of opposite longer side walls extending generally parallel to the corresponding longer side walls of the faceplate, a pair of opposite shorter wise walls extending generally parallel to the corresponding shorter side walls of the faceplate, and a corner wall positioned between respective ends of each longer side wall and the adjacent shorter side wall and confronting an associated corner between each longer side wall of the faceplate and the associated shorter side wall of the faceplate with the angle of inclination of the corner wall relative to the adjcanet longer side wall of the associated wall structure which lies in a horizontal plane is 45° or smaller; and said wall structure of the outer magnetic shield extending frontwardly a distance enough to cover the width of any one of the longer and shorter side walls of the faceplate.

2. The color cathode ray tube assembly as claimed in claim 1, further comprising a fixture secured to the faceplate for the connection of the cathode ray tube to a casing structure and a cutout defined in the corner wall so as to extend in a direction generally parallel to the longitudinal axis of the evacuated envelope for the passage therethrough of the fixture.

3. The color cathode ray tube assembly as claimed in claim 1, wherein said outer magnetic shield is mounted on the envelope with the wall structure secured to the side wall structure of the faceplate and the funnel section, respectively, by means of deposits of a bonding agent filled therebetween.

4. The color cathode ray assembly as claimed in claim 3, wherein the outer magnetic shield is provided with a fitting member secured thereto for the support of the color cathode ray tube assembly within a casing structure.

5. The color cathode ray tube assembly as claimed in claim 1, wherein all of the longer and shorter side walls and corner walls of the wall structure have a width enough to protrude outwardly and frontwardly from the screen plate of the faceplate.

6. The color cathode ray tube assembly as claimed in claim 1, wherein the ratio b/a of the length b of the corner wall of the associated wall structure as measured in a direction parallel to the adjacent longer side wall of the associated wall structure relative to the half length a of the adjacent longer side wall is chosen to be within the range of greater than 0.1 to 0.2.

7. A color cathode ray tube assembly which comprises:

(a) a highly evacuated envelope including a funnel section of generally rectangular cross-section, a neck section continued to one end of the funnel section, and a generally rectangular faceplate, said faceplate comprising a rectangular screen plate having an inner surface formed with a predetermined pattern of primary color elemental phosphor deposits to complete a phosphor deposited screen and a rectangular side wall structure, said side wall structure of the faceplate protruding from a peripheral edge of the screen plate in a direction towards the funnel section and including a pair of opposite longer side walls and a pair of shorter side walls, said faceplate being connected to the funnel section with said longer and shorter side walls integrated with the other end of the funnel section;

(b) a color selection mask disposed within the evacuated envelope in face-to-face relationship with the phosphor deposited screen; and (c) a generally tubular outer magnetic shield made of a magnetizable material and mounted on the evacuated envelope so as to encircle the side wall structure of the fireplate and also the funnel section, said outer magnetic shield comprising generally tubular rear and front wall structures;

said rear wall structure including a pair of opposite longer side walls extending generally parallel to corresponding longer side portions of the funnel section, a pair of opposite shorter side walls extending generally parallel to corresponding shorter side portions of the funnel section, and a corner wall positioned between respective ends of each longer side all and the adjacent shorter side wall of the rear wall structure and confronting an associated corner between each longer side portion of the funnel section, said corner wall of the rear wall structure having its opposite ends connected to the neighboring ends of one of the longer side wall and the shorter wide wall of the rear structure so as to form an obtuse angle relative to any one of such longer and shorter side walls of the rear wall structure; and said front wall structure including a pair of opposite longer side walls extending generally parallel to corresponding longer side walls of the faceplate, a pair of opposite shorter side walls extending generally parallel to corresponding shorter side walls of the faceplate, and a corner wall positioned between respective end of each longer side wall and the adjacent shorter side wall of the front wall structure and confronting an associated corner between each longer side wall of the faceplate and the associated shorter side wall of the faceplate, said corner wall of the front wall structure having its opposite ends connected to the neighboring ends of one of the longer side wall and the shorter side wall of the front wall structure so as to form an obtuse angle relative to any one of such longer and shorter side walls of the front wall structure wherein the angle of inclination of the corner wall relative to the adjacent longer side wall of the associated front wall structure which lies on a horizontal plane is 45° or smaller, said front wall structure extending from the rear wall structure a distance enough to cover the width of any one of the longer and shorter side walls of the faceplate;

said longer and shorter walls and corner walls of said rear wall structure being respectively continued to the longer and shorter side walls and corner walls of said front wall structure, said corner walls being operable to provide a magnetic circuit through which magnetic fields leaking from the envelope can escape.

8. The color cathode ray tube assembly as claimed in claim 7, wherein all of the longer and shorter side walls and corner walls of the front wall structure have a width enough to protrude outwardly and frontwardly from the screen plate of the faceplate.

9. The color cathode ray tube assembly as claimed in claim 7, further comprising a fixture secured to the faceplate for the connection of the cathode ray tube to a casing structure and a cutout defined in the corner wall so as to extend in a direction generally parallel to the longitudinal axis of the evacuated envelope for the passage therethrough of the fixture.

10. The color cathode ray tube assembly as claimed in claim 7, wherein the ratio b/a of the length b of the corner wall of the associated front wall structure as measured in a direction parallel to the adjacent longer side wall of the associated front wall structure relative to the half length a of the adjacent longer side wall is chosen to be within the range of greater than 0.1 to 0.2.

11. A color cathode ray tube assembly which comprises:

(a) a highly evacuated envelope including a funnel section of generally rectangular cross-section, a neck section continued to one end of the funnel section, and a generally rectangular faceplate, said faceplate comprising a rectangular screen plate having an inner surface formed with a predetermined pattern of primary color elemental phosphor deposits to complete a phosphor deposited screen and a rectangular side wall structure, said side wall structure of the faceplate protuding from a peripheral edge of the screen plate in a direction towards the funnel section and including a pair of opposite longer side walls and a pair of shorter side walls, said faceplate being connected to the funnel section with said longer and shorter side walls integrated with the other end of the funnel section;

(b) a color selection mask disposed within the evacuated envelope in face-to-face relationship with the phosphor deposited screen; and (c) a generally tubular outer magnetic shield made of a magnetizable material and mounted on the evacuated envelope so as to encircle the side wall structure of the faceplate and also the funnel section, said outer magnetic shield comprising generally tubular rear wall structure covering the funnel section and a front wall structure;

said front wall structure including a pair of opposite longer side walls extending generally parallel to corresponding longer side walls of the faceplate, a pair of opposite shorter side walls extending generally parallel to correpsonding shorter side walls of the faceplate, and a corner wall positioned between respective ends of each longer side wall and the adjacent shorter side wall of the front wall structure and confronting an associated between each longer side wall of the faceplate and the associated shorter side wall of the faceplate, said corner wall of the front wall structure having its opposite ends connected to the neighboring ends of one of the longer side wall and the shorter side wall of the front wall structure so as to form an obtuse angle relative to any one of such longer and shorter side walls of the front wall structure, wherein the angle of inclination of the corner wall relative to the adjacent longer side wall of the associated front wall structure which lies in a horizontal plane is 45° or smaller, said front wall structure extending from the rear wall structure a distance enough to cover the width of any one of the longer and shorter side walls of the faceplate;

said longer and shorter side walls and the corner walls of said front wall structure being respectively bent so as to be continued from said rear wall structure.

12. The color cathode ray tube assembly as claimed in claim 11, wherein said outer magnetic shield is of one-piece construction including the front and rear wall structures.

13. The color cathode ray tube assembly as claimed in claim 12, wherein said outer magnetic shield is mounted on the envelope with the front and rear wall structures secured to the side wall structure of the faceplate and the funnel section, respectively, by means of deposits of a bonding agent filled therebetween.

14. The color cathode ray tube assembly as claimed in claim 11, further comprising a fixture secured to the faceplate for the connection of the cathode ray tube to a casing structure and a cutout defined in the corner wall so as to extend in a direction generally parallel to the longitudinal axis of the evacuated envelope for the passage therethrough of the fixture.

15. The color cathode ray tube assembly as claimed in claim 11, wherein all of the longer and shorter side walls and corner walls of the front wall structure have a width enough to protrude outwardly and frontwardly from the screen plate of the faceplate.

16. The color cathode ray tube assembly as claimed in claim 11, wherein the ratio b/a of the length b of the corner wall of the associated front wall structure as measured in a direction parallel to the adjacent longer side wall of the associated front wall structure relative to the half length a of the adjacent longer side wall is chosen to be within the range greater than 0.1 to 0.2.

17. A color cathode ray tube assembly which comprises:

a highly evacuated envelope including a funnel section, a neck section continued to one end of the funnel section, and a generally rectangular faceplate, said faceplate comprising a rectangular screen plate having an inner surface formed with a predetermined pattern of primary color elemental phosphor deposits of complete a phosphor deposited screen and a rectangular side wall sturcture, said side wall structure of the faceplate protruding from a peripheral edge of the screen plate in a direction towards the funnel section and including a pair of opposite longer side walls and a pair of shorter side walls, said faceplate being connected to the funnel section with said longer and shorter side walls integrated with the other end of the funnel section;

a color selection mask disposed within the evacuated envelope in face-to-face relationship with the phosphor deposited screen;

a generally tubular outer magnetic shield made of a magnetizable material and mounted on the evacuated envelope so as to encircle the side wall structure of the faceplate and as the funnel section, said outer magnetic shield comprising:

a generally tubular wall structure having a pair of opposite longer side walls extending generally parallel to the corresponding longer sides walls of the faceplate, a pair of opposite shorter side walls extending generally parallel to the corresponding shorter side walls of the faceplate, and a corner wall positioned between respective ends of each longer side wall and the adjacent shorter side wall and confronting an associated corner between each longer side wall of the faceplate and the associated shorter side wall of the faceplate wherein the angle of inclination of the corner wall relative to the adjacent longer side wall of the associated front wall structure which lies in a horizontal plane is 45° or smaller; and said wall structure of the outer magnetic shield extending frontwardly a distance enough to cover the width of any one of the longer and shorter side walls of the faceplate;

said corner wall having a cutout defined therein so as to extend in a direction generally parallel to the longitudinal axis of the evacuated envelope; and a canceler coil mounted on the outer magnetic shield and having four consecutive portions, two of which extend along respective inner surfaces of the longer side walls of the wall structure through the cutouts in the corner walls and the remaining two of which extend along respective outer surfaces of the shorter side walls of the wall structure through the cutouts in the remaining corner walls.

18. The color cathode ray tube assembly as claimed in claim 17, further comprising a plurality of fixtures secured to corner areas of the faceplate for the connection of the cathode ray tube to a casing structure, said fixtures extending outwardly through the cutouts in the corner walls of the wall structure.

19. The color cathode ray tube assembly as claimed in claim 17, wherein all of the longer and shorter side walls and corner walls of the wall structure have a width enough to protrude outwardly and frontwardly from the screen plate of the faceplate.

20. The color cathode ray tube assembly as claimed in claim 17, wherein the ratio b/a of the length b of the corner wall of the associated wall structure as measured in a direction parallel to the adjacent longer side wall of the associated wall structure relative to the half length a of the adjacent longer side wall is chosen to be within the range of greater than 0.1 to 0.2.

21. The color cathode ray tube assembly which comprises:

a highly evacuated envelope including a funnel section of generally rectangular cross-section, a beck section continued to one end of the funnel section, and a generally rectangular faceplate, said faceplate comprising a rectangular screen plate having an inner surface formed with a predetermined pattern of primary color elemental phosphor deposits to complete a phosphor deposited screen and a rectangular side wall structure, said side wall structure of the faceplate protuding from a peripheral edge of the screen plate in a direction towards the funnel section and including a pair of opposite longer side walls and a pair of shorter side walls, said faceplate being connected to the funnel section with said longer and shorter side walls integrated with the other end of the funnel section;

(b) a color selection mask disposed within the evacuated envelope in face-to-face relationship with the phosphor deposited screen;

(c) a generally tubular outer magnetic shield made of a magnetizable material and mounted o the evacuated envelope so as to encircle the side wall structure of the faceplate and also the funnel section, said outer magnetic shield comprising generally tubular rear-and front wall structures;

said rear wall structure including a pair of opposite longer side walls extending generally parallel to corresponding longer side portions of the funnel section, a pair of opposite shorter side walls extending generally parallel to corresponding shorter side portions of the funnel section, and a corner wall positioned between respective ends of each longer side wall and the adjacent shorter side wall of the rear wall structure and confronting an associated corner between each longer side portion of the funnel section and the associated shorter side portion of the funnel section, said corner wall of the rear wall structure having its opposite ends connected to the neighboring ends of one of the longer side wall and the shorter side wall of the rear wall stucture so as to form an obtuse angle relative to any one of such longer and shorter side walls of the rear structure; and said front wall structure including a pair of opposite longer side walls extending generally parallel to corresponding longers side walls of the faceplate, a pair of opposite shorter side walls extending parallel to corresponding shorter side walls of the faceplate, and a corner wall positioned between respective ends of each longer side wall and the adjacent shorter side wall of the front wall structure and confronting an associated corner between each longer side wall of the faceplate and the associated shorter side wall of the faceplate, said corner wall of the front wall structure having its opposite ends connected to the neighboring ends of one of the longer side wall and the shorter side wall of the front wall structure so as to form an obtuse angle relative to any one of such longer and shorter side walls of the front wall structure, wherein the angle of inclination of the corner wall relative to the adjacent longer side wall of the associated front wall structure which lies in a horizontal plane is 45° or smaller said front wall structure extending from the rear wall structure a distance enough to cover the width of any one of the longer and shorter side walls of the faceplate;

said longer and shorter side walls and corner walls of said rear wall structure being respectively continued to the longer and shorter side walls and corner walls of said front wall structure, said corner walls being operable to provide a magnetic circuit through which magnetic fields leaking from the envelope can escape;

(d) said corner wall having a cutout defined therein so as to extend in a direction generally parallel to the longitudinal axis of the evacuated envelope; and (e) a canceler coil mounted on the outer magnetic shield and having four consecutive portions, two of which extend along respective inner surfaces of the longer side walls of the front wall structure through the cutouts in the corner walls and the remaining two of which extend along respective outer surfaces of the shorter side walls of the front wall structure through the cutouts in the remaining corner walls.

22. The color cathode ray tube assembly as claimed in claim 21, wherein all of the longer and shorter side walls and corner walls of the front wall structure have a width enough to protrude outwardly and frontwardly from the screen plate of the faceplate.

23. The color cathode ray tube assembly as claimed in claim 21, further comprising a plurality of fixtures secured to corner areas of the faceplate for the connection of the cathode ray tube to a casing structure, said fixtures extending outwardly through the cutouts in the corner walls of the front wall structure.

24. The color cathode ray tube assembly as claimed in claim 21, wherein the ratio b/a of the length b of the corner wall of the associated front wall structure as measured in a direction parallel to the adjacent longer side wall of the associated front wall structure relative to the half length a of the adjacent longer side wall is chosen to be within the range of greater than 0.1 to 0.2.

25. A color cathode ray tube assembly which comprises:

(a) a highly evacuated envelope including a funnel section of generally rectangular cross-section, a neck section continued to one end of the funnel section, and a generally rectangular faceplate, said faceplate comprising a rectangular screen plate having an inner surface formed with a predetermined pattern of primary color elemental phosphor deposits to complete a phospohor deposited screen and a rectangular side wall structure, said side wall structure of the faceplate protruding from a peripheral edge of the screen plate in a direction towards the funnel section and including a pair of opposite longer side walls and a pair of shorter side walls, said faceplate being connected to the funnel section with said longer and shorter side walls integrated with the other end of the funnel section;

(b) a color selection mask disposed within the evacuated envelope in face-to-face relationship with the phosphor deposited screen; and (c) a generally tubular outer magnetic shield made of a magnetizable material and mounted on the evacuated envelope so as to encircle the side wall structure of the faceplate and also the funnel section, said outer magnetic shield comprising generally tubular rear wall structure covering the funnel section and a front wall structure;

said front wall structure including a pair of opposite longer side walls extending generally parallel to corresponding longer side walls of the faceplate, a pair of opposite shorter side walls extending generally parallel to corresponding shorter side walls of the faceplate, and a corner wall positioned between respective ends of each longer side wall and the adjacent shorter side wall of the front wall structure and confronting an associated corner between each longer side wall of the faceplate and the associated shorter side wall of the faceplate, said corner wall of the front wall structure having its opposite ends connected to the neighboring ends of one of the longer side wall and the shorter side wall of the front wall structure so as to form an obtuse angle relative to any one of such longer and shorter side walls of the front wall structure, wherein the angle of inclination of the corner wall relative to the adjacent longer side wall of the associated front wall structure which lies in a horizontal plane is 45° or smaller said front wall structure extending from the rear wall structure a distance enough to cover the width of any one of the longer and shorter side walls of the faceplate;

said longer and shorter side walls and corner walls of said front wall structure being respectively bent so as to be continued from said rear wall structure;

(d) said corner wall having a cutout defined therein so as to extend in a direction generally parallel to the longitudinal axis of the evacuated envelope; and (e) a canceler coil mounted on the outer magnetic shield and having four consecutive portions, two of which extend along respective inner surfaces of the longer side walls of the front wall structure through the cutouts in the corner walls and the remaining two of which extend along respective outer surfaces of the shorter side walls of the front wall structure through the cutouts in the remaining corner walls.

26. The color cathode ray tube assembly as claimed in claim 25, wherein said outer magnetic shield is of one-piece construction including the front rear wall structures.

27. The color cathode ray tube assembly as claimed in claim 26, wherein said outer magnetic shield is mounted on the envelope with the front and rear wall structures secured to the side wall structure of the faceplate and the funnel section, respectively, by means of deposits of a bonding agent filled therebetween.

28. The color cathode ray tube assembly as claimed in claim 25, wherein all of the longer and shorter side walls and corner walls of the front wall structure have a width enough to protrude outwardly and frontwardly from the screen plate of the faceplate.

29. The color cathode ray tube assembly as claimed in claim 25, further comprising a plurality of fixtures secured to corner areas of the faceplate for the connection of the cathode ray tube to a casing structure, said fixtures extending outwardly through the cutouts in the corner walls of the front structure.

30. The color cathode ray tube assembly as claimed in claim 25, wherein the ratio b/a of the length b of the corner wall of the associated front wall structure as measured in a direction parallel to the adjacent longer side wall of the associated front wall structure relative to the half length a of the adjacent longer side wall is chosen to be within the range of greater than 0.1 to 0.2.

* * * * *